US008496529B2

(12) United States Patent
Narita et al.

(10) Patent No.: US 8,496,529 B2
(45) Date of Patent: Jul. 30, 2013

(54) GAME SYSTEM

(75) Inventors: Yoshihiko Narita, Tokyo (JP);
Yoshinobu Morimoto, Tokyo (JP);
Hiroshi Naraoka, Tokyo (JP); Tadashi Minamino, Tokyo (JP); Takahiro Ohashi, Tokyo (JP); Yoko Takeuchi, Tokyo (JP); Takashi Inubushi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1440 days.

(21) Appl. No.: 11/719,707

(22) PCT Filed: Sep. 27, 2005

(86) PCT No.: PCT/JP2005/017765
§ 371 (c)(1),
(2), (4) Date: Jun. 13, 2007

(87) PCT Pub. No.: WO2006/057103
PCT Pub. Date: Jun. 1, 2006

(65) Prior Publication Data
US 2009/0156302 A1 Jun. 18, 2009

(30) Foreign Application Priority Data
Nov. 25, 2004 (JP) ................................. 2004-340270

(51) Int. Cl.
*A63F 13/12* (2006.01)
(52) U.S. Cl.
USPC ............................................. 463/42; 463/29
(58) Field of Classification Search
USPC ...................................................... 463/29, 42
See application file for complete search history.

(56) References Cited

U.S. PATENT DOCUMENTS

| 5,809,482 A | 9/1998 | Strisower |
| 6,996,444 B2 | 2/2006 | Ach, III |
| 7,677,970 B2 * | 3/2010 | O'Kelley et al. ................ 463/25 |

(Continued)

FOREIGN PATENT DOCUMENTS

| EP | 1371403 A2 | 12/2003 |
| JP | 2001-120841 A | 5/2001 |

(Continued)

OTHER PUBLICATIONS

English Machine Translation of Japanese Application, JP-2003-281142.*

(Continued)

*Primary Examiner* — Damon Pierce
(74) *Attorney, Agent, or Firm* — Edwards Wildman Palmer LLP; Brian R. Landry

(57) ABSTRACT

A game system for a game where plural players partake and are combined on the basis of subjective data on the players. A game machine comprises a game control device for controlling a game executed with a game machine operated by a player who is combined with a player operating the game machine itself, an evaluation obtaining device for obtaining evaluation data which is evaluation to the player P4 by the player, a history evaluation updating device for, when obtaining the evaluation data to the player, updating the history evaluation information included in player information of the player by information based on the evaluation data. The server comprises a combination determining device for determining based on the history evaluation information, a combination of game machines partaking the game.

10 Claims, 13 Drawing Sheets

U.S. PATENT DOCUMENTS

| | | | |
|---|---|---|---|
| 8,066,568 B2 * | 11/2011 | O'Kelley et al. | 463/42 |
| 8,221,238 B1 * | 7/2012 | Shaw et al. | 463/42 |
| 2003/0216962 A1 | 11/2003 | Heller et al. | |
| 2005/0070355 A1 | 3/2005 | Shimizu | |
| 2005/0187644 A1 | 8/2005 | Neale et al. | |
| 2005/0192097 A1 | 9/2005 | Farnham et al. | |
| 2006/0205503 A1 | 9/2006 | Miura et al. | |
| 2007/0191110 A1 | 8/2007 | Crouse | |

FOREIGN PATENT DOCUMENTS

| | | |
|---|---|---|
| JP | 2001-157782 A | 6/2001 |
| JP | 2003-196420 A | 7/2003 |
| JP | 2003-281142 A | 10/2003 |
| JP | 2004-275485 | 10/2004 |
| JP | 2004-298234 A | 10/2004 |
| WO | 02/089937 A1 | 11/2002 |
| WO | 03/025828 A2 | 3/2003 |

OTHER PUBLICATIONS

Battle Climac, Arcadia Magazine, Jun. 2004 (No. 49) Enterbrain Inc. une1, 2004. vol. 5, No. 6 pp. 24-31.

Battle Climaxx! Arcadia Magazine, Dec. 2004 (No. 55) published by Enterbrain Inc. on Dec. 1, 2004, vol. 5, No. 12 (Serial No. 55) pp. 107.

* cited by examiner

FIG. 4A

| | | |
|---|---|---|
| | WRETLER ID | A0001 |
| | POWER | 16 |
| | SPEED | 10 |
| | TECHNIQUE | 10 |
| | TOUGHNESS | 10 |
| | LIFE-POINT | 100 |

FIG. 4B

| | | |
|---|---|---|
| | TECHNIQUE ID | B0001 |
| | POWER | 10 |
| | SPEED | 20 |
| | TECHNIQUE | 10 |
| | MAX-DAMAGE VALUE | 100 |

FIG. 5

| PLAYER ID | HISTORY EVALUATION INFORMATION | PARTAKING TIMES | WIN RATIO |
|---|---|---|---|
| 41 | 42 | 43 | 44 |
| | WRESTLER ID | TECHNIQUE ID | EXPERIENCE VALUE |
| | 21 | 31 | 45 |

Player of Evaluation A ..... Any One of Players of Evaluation A, B, C

Player of Evaluation B ..... Any One of Players of Evaluation A, B, C

Player of Evaluation C ..... Any One of Players of Evaluation B, C, D

Player of Evaluation D ..... Any One of Players of Evaluation C, D, E

Player of Evaluation E ..... Any One of Players of Evaluation D, E, F

Player of Evaluation F ..... Any One of Players of Evaluation D, E, F

FIG. 13

PLEASE EVALUATE YOUR OPPONENT

| OPPONENT TO BE EVALUATED | KONAMI TARO |

- rank A — EXCELLENT
- rank B — GOOD
- rank C — NORMAL
- rank D — NO GOOD
- rank E — WORST

GAME SYSTEM

CROSS REFERENCES TO RELATED APPLICATIONS

This is a U.S. national phase application under 35 U.S.C. §371 of International Patent Application No. PCT/JP2005/017765 filed Sep. 27, 2005, and claims the benefit of Japanese Application No. 2004-340270 filed Nov. 25, 2004. The International Application was published in Japanese on Jun. 1, 2006 as International Publication No. WO 2006/057103 A1 under PCT Article 21(2), the content of which is incorporated herein in its entirety.

TECHNICAL FIELD

The present invention relates to a game system in which a combination of game machines partaking in one game is determined by a server.

BACKGROUND ART

In a game played between a plurality of game machines connected with each other via communication lines, in the case of a battle game, for example, a game system where a combination of game machines battling with each other is determined by a server has been well known. More over, a game system where a player evaluates play of another player has been also well known (for example, Japanese unexamined patent application 2003-281142).

SUMMARY OF THE INVENTION

However, in conventional game systems, for combining players suitably for a game, a combination is determined based on objective data of players, such as a win ratio led from forepast game results, the number of playing games, and their profiles. From like this objective data, it is sometimes hard to determine a subjective element of the player, for example, a game preference. Thereby, when the players who have different preference from each other are combined, the problem occurs that both of the players can not enjoy playing satisfactorily. On the other hand, there is no system where a server determines a combination of players based on the subjective data of the players.

Therefore, the present invention is aimed at providing a game system for a game where plural players partake, where the players are combined with each other based on the subjective data about players.

The present invention solves the above mentioned problems by the following devices. Reference numbers of attached drawings are shown in brackets, but the present invention is not limited to the embodiment of the drawings.

A game system of the present invention includes a server capable of transmitting and receiving data via a communication line; a plurality of game machines; a player information storage device for storing information about players corresponded to each player identification information for identifying each player operating each of the plurality of game machines; the server determining a combination of the game machines partaking in one game based on the information of players; and the game being executed between the combined game machines, wherein the game machine comprises: a game control device for controlling the game executed together with another game machine operated by another player, who is determined by the server to be combined with the player operating the game machine itself; an evaluation obtaining device for obtaining evaluation data which is an evaluation to the another player by the player operating the game machine itself; and a history evaluation updating device for, when obtaining the evaluation data to the player operating the game machine itself, updating history evaluation information including the player information of the player operating the game machine itself by information based on the evaluation data; and the server has a combination determining device for determining based on the history evaluation information, a combination of game machines to partake in the game, thereby the above problem is solved.

According to the game system of the present invention, at each game machine, the evaluation by a player corresponding to each game machine to a combined player is obtained as the evaluation data. Then, a combination of players is determined based on the history evaluation information updated by the evaluation data. The evaluation data is subjective data of each player. By updating the history evaluation information based on this subjective data, it is possible to regard the history evaluation information of a specified player as evaluation into which the subjective data of the other players is integrated. Namely, the history evaluation of a player who is always given low evaluation from the other players gets lower, and the history evaluation of a player who is always given high evaluation gets higher.

Consequently, integrated opinion of players is reflected to the history evaluation information. Therefore, according to the present invention, the combination of players can be determined based on the integrated opinion. Thereby, without regard for objective data such as win-loss of game, the combination of players can be determined based on the subjective data of each player. The game executed in the game system of the present invention includes a game where the combined players act as members of a party and a battle game where the combined players battles with each other.

"Information based on the evaluation data" includes the case where the information is the evaluation data itself and the case where the information is obtained by processing the evaluation data by other data. "Evaluation data" dealt by the history evaluation updating device includes the evaluation data obtained by the evaluation obtaining device of the game machine itself and the evaluation data obtained by the evaluation obtaining device of the other game machines. "Based on the history evaluation information" includes the case where only the history evaluation information is used and the case where other information is used in addition to the history evaluation information.

The game machine of the present invention may include a history evaluation communication device for transmitting the history evaluation information included in the player information of the player operating the game machine itself with the player identification information of the player operating the game machine itself, and the combination determining device may determine the combination based on the history evaluation information transmitted from the history evaluation communication device during a predetermined time. Thereby, the server can determine the combination of players by only dealing with the history evaluation information received from the game machines during the predetermined time.

Moreover, the game may be a game where a skill evaluation with respect to skills of the player operating the game machine itself is executed in accordance with a predetermined criteria, and a game result based on the skill evaluation may be presented to the player operating the game machine itself. The skill evaluation indicating a skill for a game of a player is executed by objective data to emphasize on fairness.

However, according to the present invention, the combination of players is determined not based on the skill evaluation of objective data, but based on the evaluation data of subjective evaluation of other players.

The game machine may have a modification evaluation generating device for, when obtaining the evaluation data from the another game machine operated by the another player, generating a modification evaluation based on the history evaluation information of the another player, and the history evaluation updating device may update the history evaluation information of the player operating the game machine itself by information based on the evaluation data obtained by using the evaluation data and the modification evaluation.

Thereby, the modification evaluation is generated by adding the history evaluation information of the player who has evaluated to the obtained evaluation data, and the history evaluation information is updated based on the modification evaluation. Consequently, for example, the effect of the evaluation by a player having high history evaluation information can be set to be different from the effect of the evaluation by a player having low history evaluation information. Namely, as the evaluation to the player who has evaluated is also taken into account, a fairer evaluation can be obtained as the modification evaluation.

The game machine may include an evaluation data transmitting device for transmitting the evaluation data with the player identification information of the player operating the game machine itself to the another game machine operated by the another player, the modification evaluation generating device, when receiving the evaluation data transmitted from the evaluation data transmitting device of the another game machine operated by the another player, may generate the modification evaluation based on the history evaluation information corresponding to the player identification information of the another player transmitted with the evaluation data, and the history evaluation updating device may update the history evaluation information of the player operating the game machine itself by the modification evaluation and information based on the evaluation data obtained by using the evaluation data transmitted from the evaluation data transmitting device of the another game machine operated by the another player. Thereby, each game machine can handle the evaluation data by the other players for the player corresponding to the game machine itself in a lump.

Moreover, the history evaluation information may have an evaluation value obtained by modifying by a modification value included in the modification evaluation, the evaluation data transmitted from the evaluation data transmitting device of the another game machine operated by the another player, and the modification evaluation may be in accordance with measure of the evaluation value of player history evaluation information of the another player. Thereby, the evaluation by a player having high history evaluation can be set to have a great influence on the update of the history evaluation information of evaluated player, and the evaluation by a player having low history evaluation can be set have few influence on the update of the history evaluation information of evaluated player.

The evaluation obtaining device may present to the player operating the game machine itself, a plurality of choices where, with respect to a particular tendency about the game, evaluation sentences indicating in a stepwise fashion about whether the combined player the tendency is strong or not, and may obtain as the evaluation data, a value corresponded to the choice selected by the player. Thereby, the evaluation data indicating a level for a particular tendency of another player can be obtained only by making a player select a choice.

As mentioned above, according to the present invention, the evaluation data which is evaluation by another player is obtained to update the history evaluation information, and the combination of players is determined based on the history evaluation information. Thereby, for a game which plural players partake, the game system where players are combined based on subjective data on the players can be provided.

BRIEF DESCRIPTION OF DRAWING

FIG. 4A is a diagram of wrestler information;

FIG. 4B is a diagram of technique information;

FIG. 5 is a diagram of player information;

FIG. 9 is an association table showing regulations of players to be combined with each other in the present embodiment;

FIG. 13 is a diagram an example of a plurality of choices to be displayed at a game machine.

DETAILED DESCRIPTION OF THE INVENTION

Figure 1:
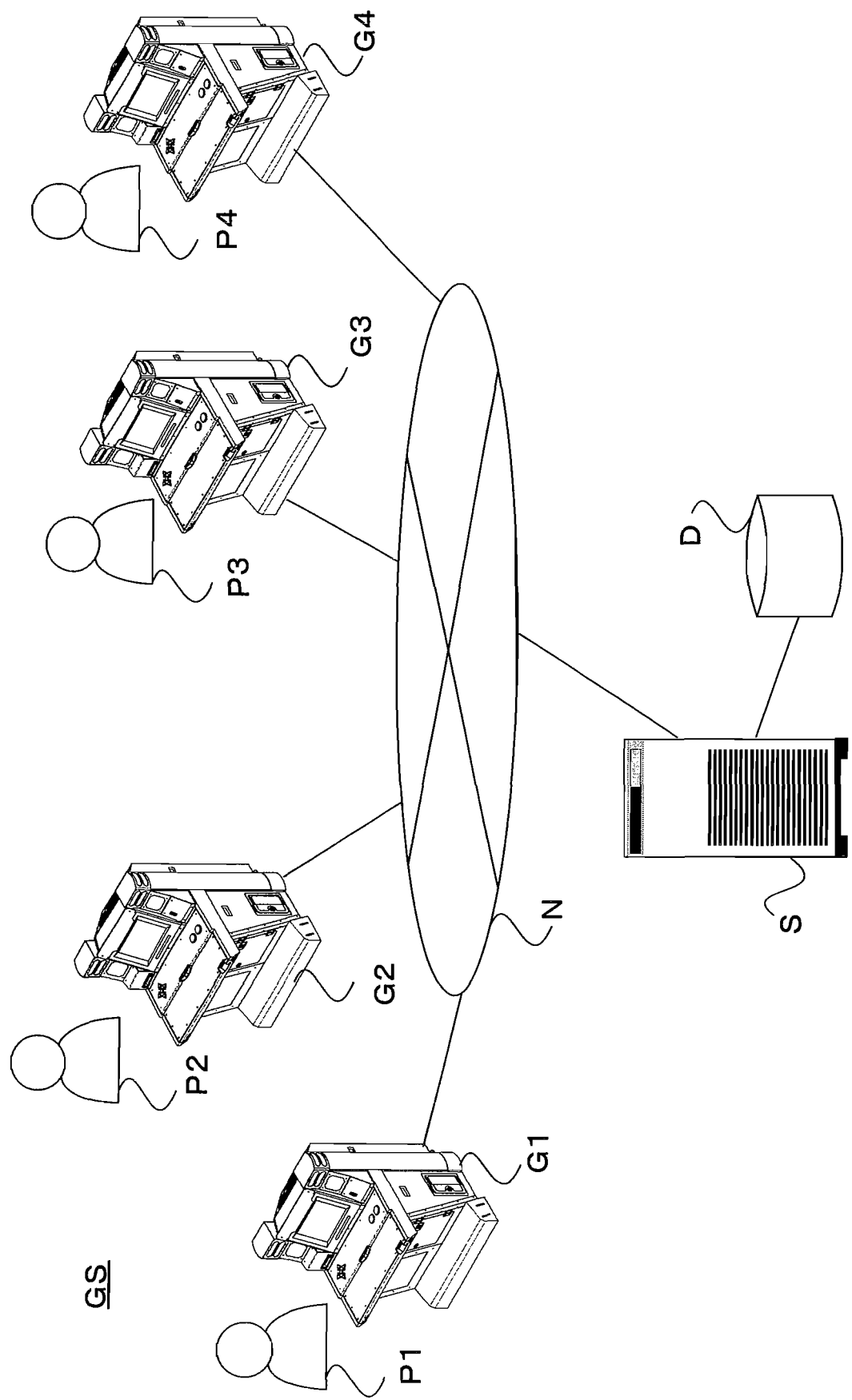
FIG. 1 is a diagram of an example of a game system of the present invention.

FIG. 1 is a diagram showing an example of a game system GS of the present invention. In the game system GS, a plurality of game machines G1, G2, G3, G4 and a server machine S are connected with each other via a communication network N so that they are capable of transmitting and receiving data with each other. A game data storage device D in which various data with respect to a game is stored is connected with the server machine S. Players P1, P2, P3 and P4 operate the game machine G1, G2, G3 and G4 respectively. Hereinafter, the game machine G1, G2, G3 and G4 and the players P1, P2, P3 and P4 are referred to as "a game machine G" and "a player P" respectively, when it is not needed to distinguish them.

Moreover, a relationship between a game machine G and a player operating the game machine G is referred to as "a player P corresponding to a game machine G" or "a game machine G corresponding to a player P". In the game system GS of the present invention, players P corresponding to two of the game machines G are combined with each other as opponents and a professional wrestling game is executed. A network used public lines such as the internet is employed as the communication network N of the present embodiment. Each of the game machine and the server machine has the IP address, by which data transmission and reception is executed.

Figure 2:
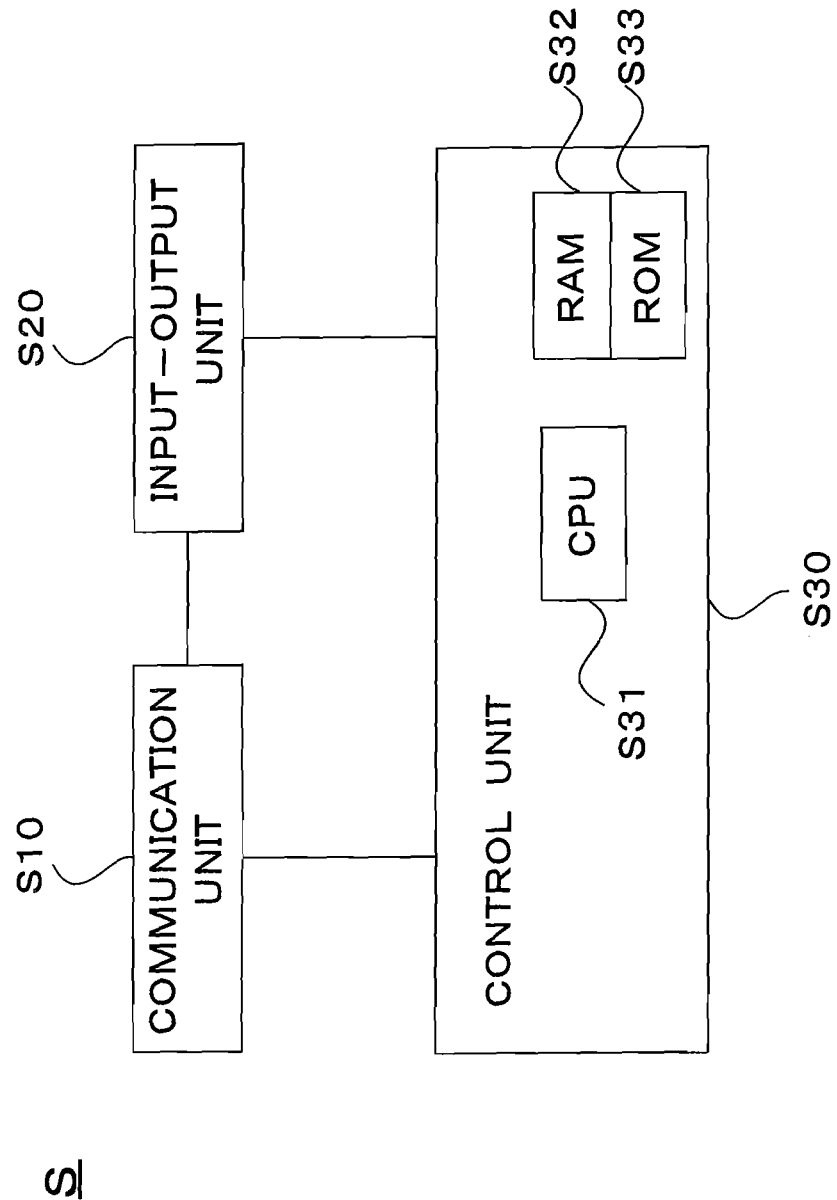
FIG. 2 is a schematic construction diagram of a server machine.

The server S executes a matching process described later, as well as transmission and reception of data stored in the game data storage device D in response to requests of the game machine G. The schematic construction diagram of the server machine S is shown in FIG. 2. The server machine S comprises a communication unit S10 for data transmission and reception with the game machines G, an input-output unit S20 for data input and output with the game data storage device D, and a control unit S30 for controlling each unit of the server machine S. The control unit S30 is configured as a computer comprising a CPU S31 and various kinds of peripheral circuits needed for operations of the CPU S31 such as RAM S32 and ROM S33, and functions mainly as a combination determining device.

Figure 3:
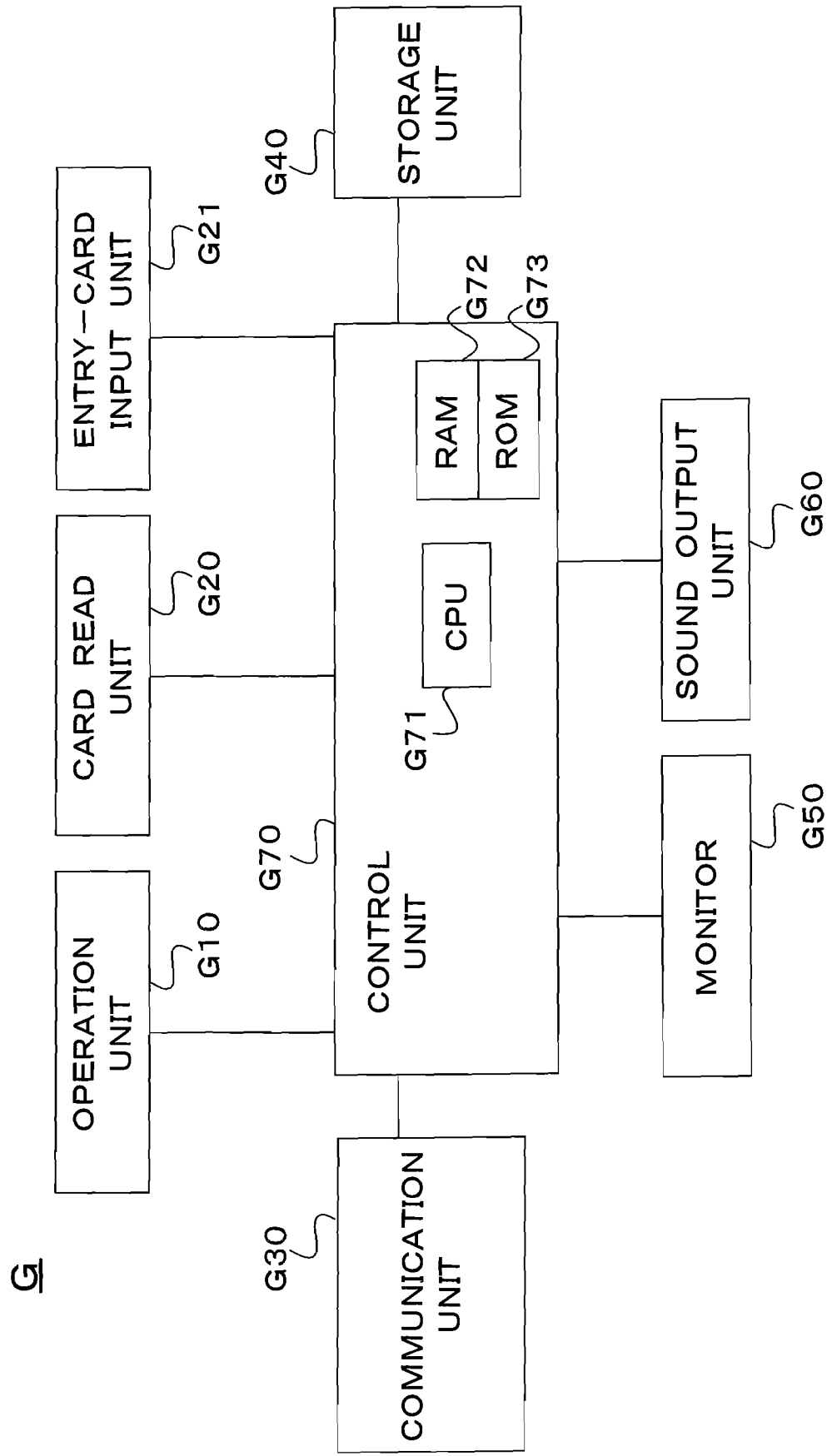
FIG. 3 is a schematic construction diagram of a game machine.

The game machine G executes a professional wrestling game with another game machine G combined with itself by the server machine S, and after the game, executes an evaluation process described later. The schematic construction diagram of the game machine G is shown in FIG. 3. The game machine G comprises an operation unit G10 including various kinds of levers and buttons to be operated by a player P, a card read unit G20 for reading data of a card used arbitrarily while the player P is playing the game, an entry-card input unit G21 for inserting an entry card to be used at the moment of entry, a communication unit G30 as a history evaluation communication device and an evaluation data transmitting device for transmitting and receiving data with the server machine S and the another game machine G, a storage unit G40 for storing various kinds of data for the game, a monitor G50 for presenting to the player P, proceeding of the game and various kinds of messages, a sound output unit G60 for outputting various kinds of sound, and a control unit G70 for controlling operation of each unit of the game machine G.

The control unit G70 is configured as a computer comprising a CPU G71 and various kinds of circuits, such as RAM G72 and ROM G73, necessary for operations of the CPU 47, and functions mainly as a game control device, an evaluation obtaining device and a history evaluation updating device. The operation unit G10 has a passive button for designating a passive state and a fall button for designating a fall described later.

In the game data storage device D, wrestler information 20 that is information about each wrestler and technique information 30 that is information about each technique is stored as information common to the game system GS. In the wrestler information 20, as shown in FIG. 4A, a wrestler ID 21 unique to each wrestler is associated with values of battle parameters of the wrestler, such as a power 22, a speed 23, a technique 24, a toughness 25 and a life-point 26. In the technique information 30, as shown in FIG. 4B, a technique ID 31 unique to each technique is associated with values of technique parameters of the technique, such as a power 32, a speed 33, a technique 34 and a maximum-damage value 35.

Moreover, the game data storage device D stores information about a player P to function as a player information storage device. An example of data construction of a player information 40 stored in the game data storage device D is shown in FIG. 5. In the player information 40, a player ID 41 as a player identification information unique to each player P and information about the player P is associated with each other. The information about the player P includes history evaluation information 42 of the player P, partaking times 43 indicating the times of partaking in the game, win ratio 44 of the game, wrestler IDs 21, technique IDs 31 and an experience value 45. The experience value 45 is a parameter indicating how much percent of the maximum damage can be given to the opponent when the player P allows the wrestler ID 21 to use the technique 31.

The experience value 45 can be changed when the player P allows the wrestler corresponding to the wrestler ID to train the technique corresponding to the technique ID 31. The description of the training is omitted. The history evaluation information 42 is history information of the evaluation to the player P. In the present embodiment, the history evaluation information 42 is an evaluation value in a range from −500 to +500. The way how to obtain the history evaluation information 42 is described later.

Figure 6:
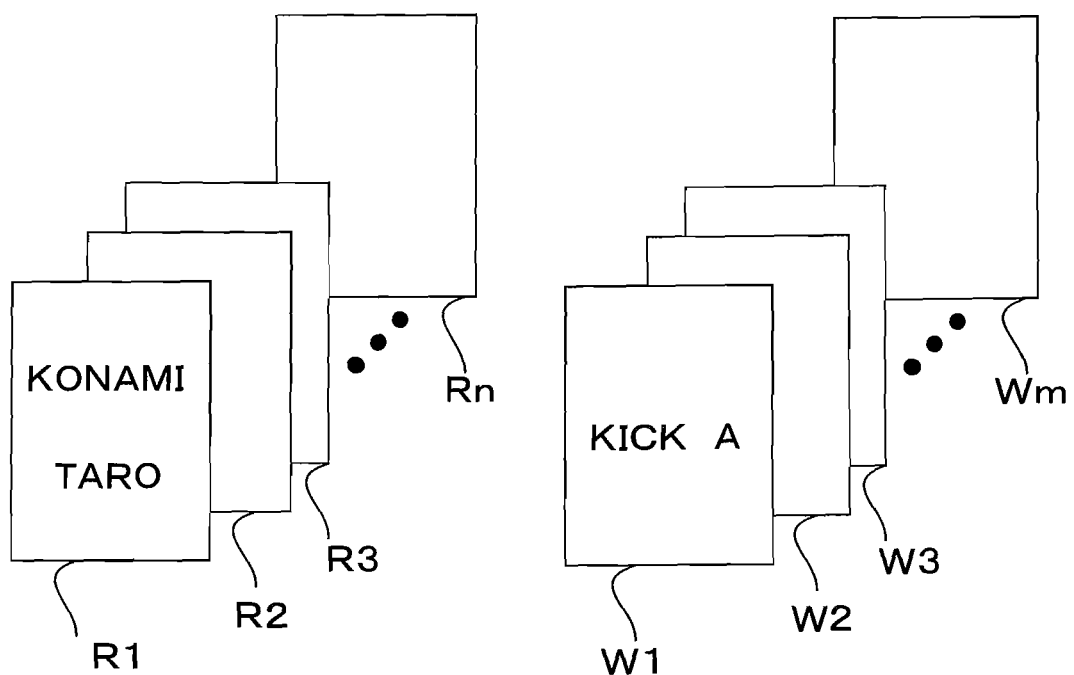
FIG. 6 is a diagram showing wrestler cards and technique cards player holds in advance.

In the present embodiment, the player P has some kinds of wrestler cards R1 . . . Rn and technique cards W1 . . . Wn, as shown in FIG. 6 in advance. Hereinafter, the wrestler cards R1 . . . Rn and the technique cards W1 . . . Wn are called "a wrestler card R" and "a technique card W" respectively when it is not needed to distinguish them. The player P can designate a wrestler to partake in a battle by using the wrestler card R, and designate a technique to be used by using the technique card W.

In the wrestler card R, the wrestler ID 21 of the wrestler who is showed on the card is stored. When the card read unit G20 of the game machine G is allowed to read the wrestler card R, wrestler information 20 can be used through the wrestler ID 21 as a key. In the technique card W, the technique ID 31 is stored. By allowing the card read unit G20 to read the technique card W, technique information 30 can be used through the technique ID 31 as a key.

Hereafter, there is described from the process for the player P to actually partake in a professional wrestling game provided by the game system GS to the process for executing evaluation. First of all, an entry process and a matching process which are executed before the professional wrestling game starts will be described according to FIG. 7, in the case of the player P1 operating the game machine G1. First, the entry process (step S100) will be described. The player P1 operates a predetermined entry operation to the game machine G1 as the entry process. In the present embodiment, the player P1 operates the entry card having the player ID 41 of the player P1 to be read into the game machine G1 via the entry card input unit G21, and operates the wrestler card R of the wrestler to partake in the game and the technique card W of the technique to be used in the game to be read into the game machine G1 via the card read unit G20.

Moreover, the player P chooses whether he/she will play the game emphasizing entertainment or the game emphasizing win-loss. The choice of the emphasis on entertainment or the emphasis on win-loss indicates the tendency of the player P as to the professional wrestling game. The emphasis on entertainment means that the player P plays the game emphasized on show aspect as a professional wrestling regardless of win-loss. The emphasis on win-loss means that the player P plays the game emphasized on win-loss of the game. In the present embodiment, the case will be described where the game emphasized on entertainment is chosen.

The player ID 41 of the player P1 is read into the game machine G1 by the entry card, the wrestler ID 21 of the wrestler to partake in the game is read into the game machine by the wrestler card R, and the technique ID 31 of the technique to be used in the game is read into the game machine by the technique card W. The game machine G1 transmits entry information including the player ID 41, the wrestler ID 21 and the technique ID 31, which have been read into the game machine G1, to the server machine S.

When receiving the entry information, the server machine S extracts from the game data storage device D, the player information 40 associated with the player ID 41 included in the entry information, the wrestler information 20 associated with the wrestler ID 21 included in the entry information, and the technique information 30 associated with the technique ID 31 included in the entry information, and transmits the extracted information to the game machine G1. Hereinafter, the player information 40, the wrestler information 20 and the technique information 30 to be transmitted to the game machine G from the server machine S in the entry process is collectively called battle data. The game machine G1 stores the received battle data into the storage unit G40. At this moment, each of the wrestler information 20 and the technique information 30 included in the received battle data is got associated with the player ID 41 of the player P1. Hereinafter, the data associated with the player ID 41 of the player P1 is called "the battle data of the player P1". This is the end of the entry process.

Figure 8:
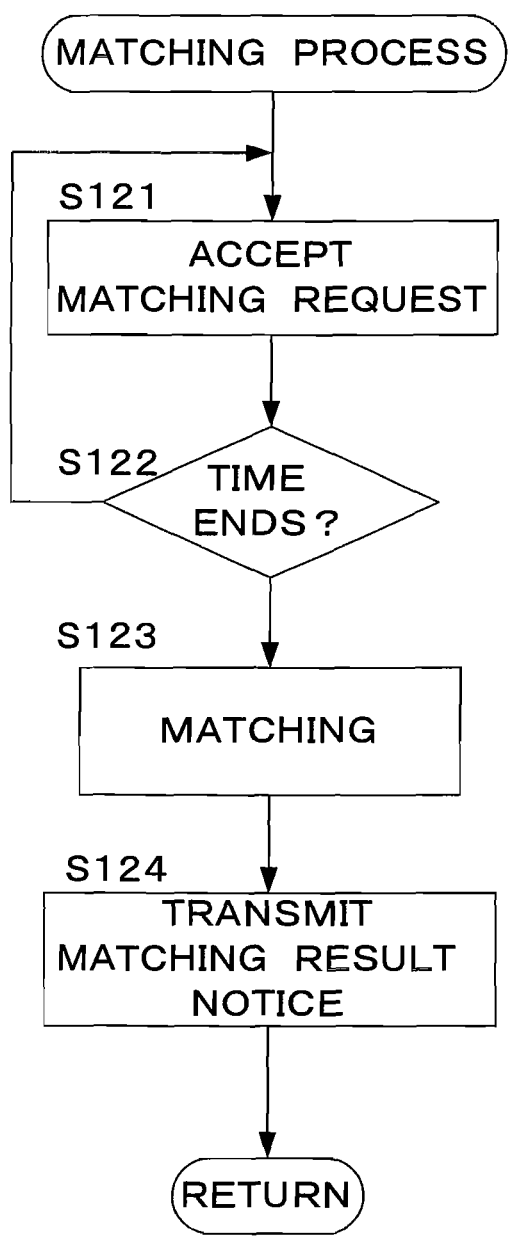
FIG. 8 is a flowchart showing a process flow of the matching process.

When receiving the player information 40 of the player P1, the game machine G1 transmits to the server machine S, a matching request including the history evaluation information 42 of the player information 40 and the player ID 41 of the player P1 (step S110). When receiving the matching request, the server machine S executes the matching process (step S120). The matching process will be described according to a flow chart shown in FIG. 8. The matching process is executed by the control unit S30 of the server machine S. Thereby, the control unit S30 functions as a combination determining device.

The matching request transmitted from each game machine G is received while a predetermined duration of entry time is being counted (step S121). The history evaluation information 42, the player ID 41, and IP address indicating a transmitter included in the received matching request are stored into, for example, the RAM S32 in the state that they are associated with each other. It is determined whether the timer of entry time ends or not (step S122). When the timer does not end, the process returns to step S121 to continue receiving the matching request.

When the timer ends, the matching process is executed (step S123). Specifically, plural pieces of the history evaluation information 42 included in the plural matching requests received during the entry time are compared with each other, and when the history evaluation information 42 of the players P are equal to or close to each other, the players P are combined with each other. In the present embodiment, the range of the evaluation value of the history evaluation information 42, that is from −500 to +500 is divided into 6 steps of evaluation A, B, C, D, E and F in descending order of evaluation. The players P who have transmitted the matching request are matched, that is, combined with each other according to the regulation shown in FIG. 9.

When the players P are combined with each other, a matching result notice is transmitted, the matching result notice including as the IP address of an opponent, the IP address of the player P combined as the opponent is transmitted (step S124). In the present embodiment, the case where the player P1 and the player P4 are combined with each other by the matching process will be described. In this case, the matching result notice including the IP address of the game machine G4 of the player P4 is transmitted to the game machine G1. Hereinafter, the player P4 is sometimes called the opponent P4.

Figure 7:
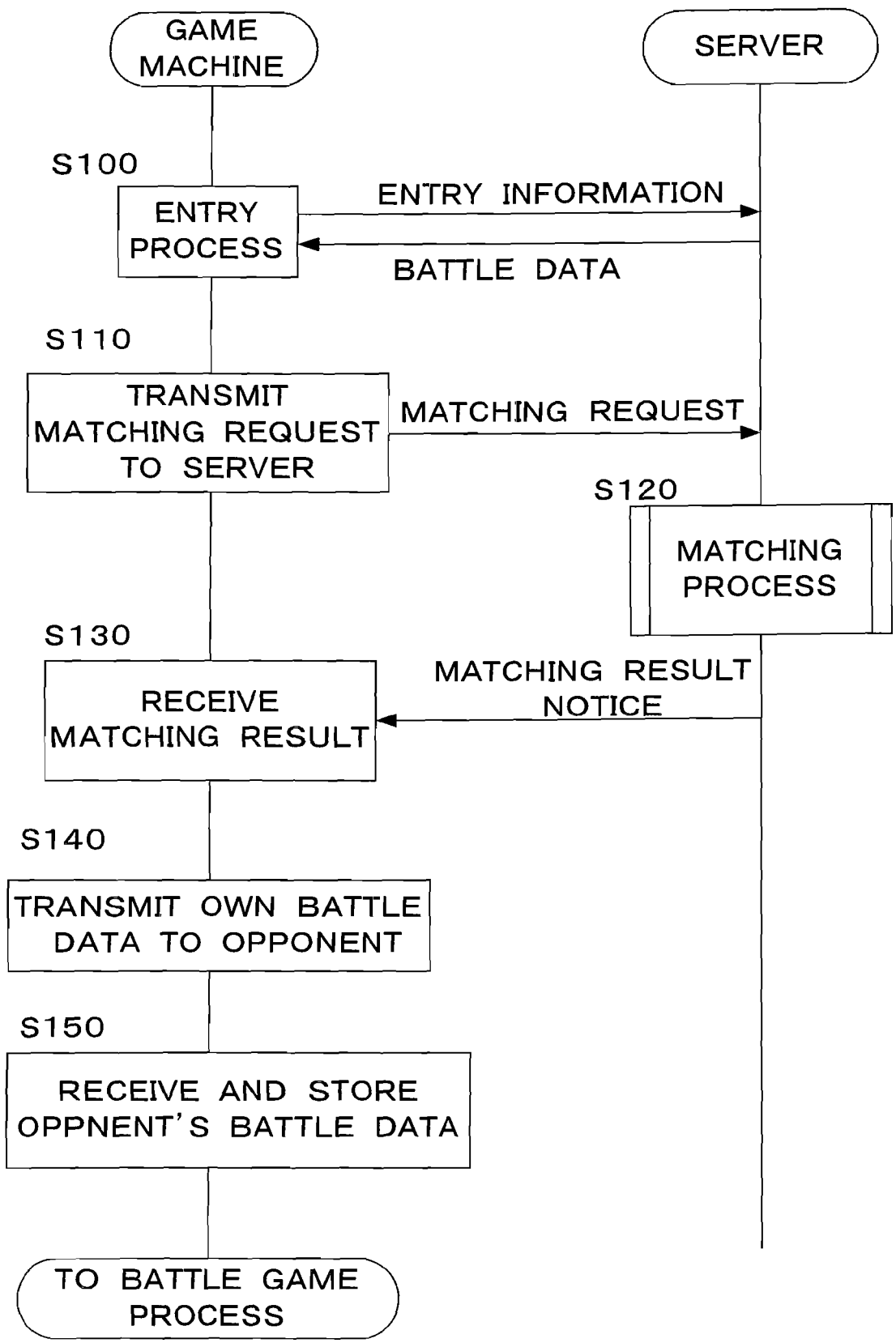
FIG. 7 is a sequence diagram showing data transmission and reception between the game machine and the server machine in an entry process and a matching process.
Figure 10:
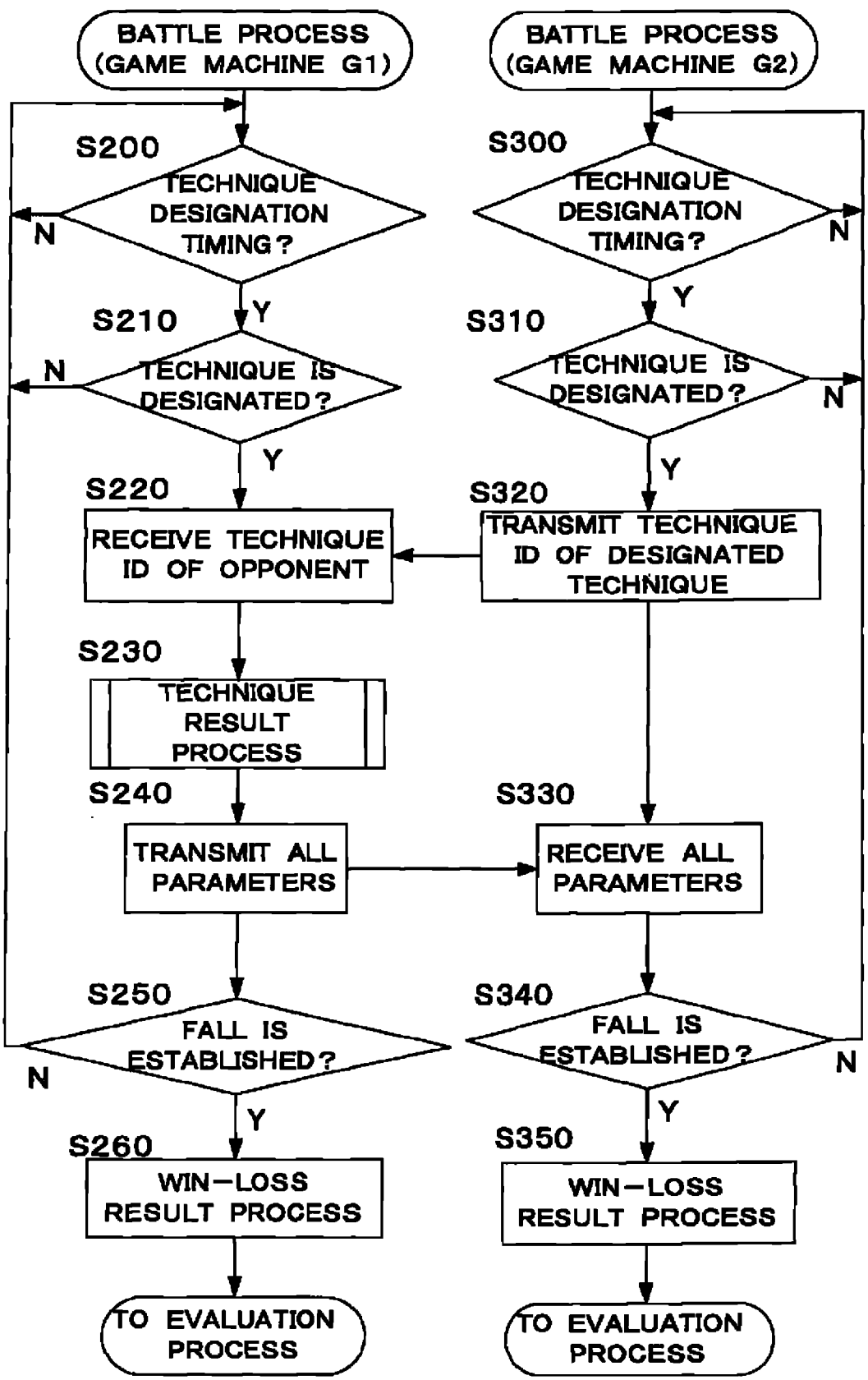
FIG. 10 is a flowchart showing a process flow of a battle game process.

The description returns to FIG. 7. When the game machine G1 receives the matching result notice (step S130), the game machine G1 transmits the battle data of the game machine G1 to the IP address of the opponent P4 included in the received matching result notice (step S140). On the other hand, when receiving the battle data of the opponent P4 transmitted from the opponent P4, the game machine G1 stores the battle data into the storage unit G40 (step S150). After that, the process advances to a battle game process. Also, in the game machine G4 of the opponent P4, the entry process is executed in the same way. The battle game process will be described according to a flow chat shown in FIG. 10. The battle game process is executed by the control unit G70 of the game machine G. Thereby, the control unit G70 functions as a game control device. In the present embodiment, by harmonizing between the game machines G1, G4 to battle with each other, the game machine G1 and the game machine G4 are determined to be a game server and a game client respectively to advance the game. The battle process of the game machine G1 is synchronized with the battle process of the game machine G4 by the conventional method.

Hereinafter, when there is no especial comment, in the case where the data included in the battle data of the player P1 is used at the game machine G1, the data associated with the player ID 41 is used by using the player ID 41 of the player P1 stored in the storage unit G40 of the game machine G1 as a key. In the case where the data included in the battle data of the opponent P4 at the game machine G1, the data associated with the player ID 41 is used by using the player ID 41 of the opponent P4 stored in the storage unit G40 of the game machine G1 as a key.

After the battle process starts, it is determined whether now is a technique designation timing to designate a technique or not at the game machine G1 and the game machine G4 (S200, S300). When it is determined that now is the technique designation timing, it is determined whether a technique has been designated (S210, S310). It is determined that now is the technique designation timing in the case where the timer for counting the technique designation timing has started and been counting the time. It is determined that a technique has been designated in the case where the player P1, P4 allows the card read unit G20 of the game machine G1, G4 to read the technique card W. At the game machine G4, when the technique is designated by the player P4, the technique ID 31 of the technique is transmitted to the game machine G1 (step S320). The game machine G1 receives the technique ID 31 transmitted from the game machine G4 (step S220).

The player P1, P4 can designate a passive state instead of a technique during the technique designation timing by pushing the passive button of the operation unit G10. In this case, the data indicating the passive state as the technique ID 31 can be transmitted. Hereinafter, the description will deal with the designation of a passive state as one type of the designation of a technique. Moreover, when no technique is designated during the technique designation timing, a predetermined technique is selected automatically, which makes the state of designation of technique.

The technique result process is executed to determine which technique wins based on the technique information 30 of them (step S230). The technique result process will be described later. When the technique result process ends, all parameters used in the battle are transmitted from the game machine G1 to the game machine G4 (step S240), and the game machine G4 receives the all parameters transmitted from the game machine G1 (step S330). After all parameters are received, it is determined whether a fall is established at each of the game machines G1, G4 (S250, S340). When it is determined that a fall is not established, the battle game is carried on, that is, returns the state where a technique can be designated again. On the other hand, when it is determined that a fall is established, it is determined that "a winner" is the player P1 and "a loser" is the player P4 in the case where a player P who has succeeded at establishing the fall is the player P1, and the game result is displayed on the monitor G50 of each game machine G1, G4. Then, the battle game ends (step S260, S350).

Figure 11:
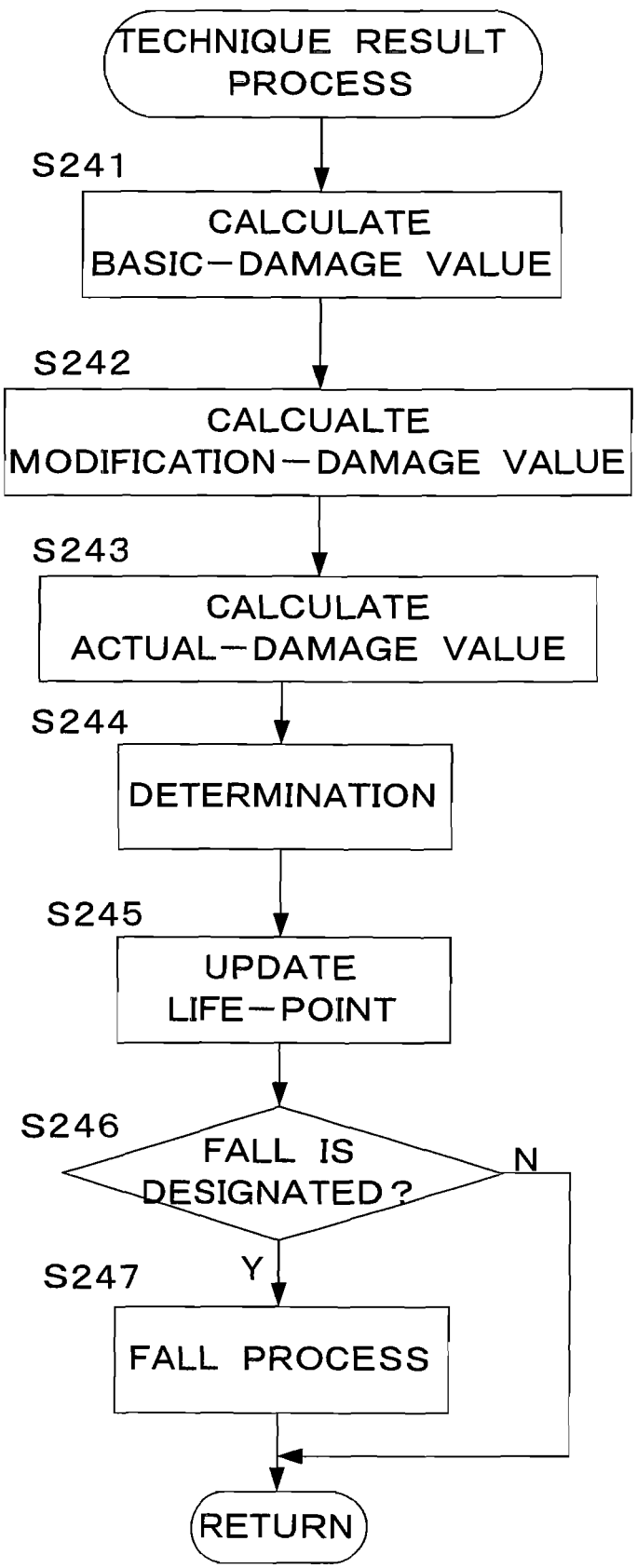
FIG. 11 is a flowchart showing a process flow of a technique result process.

The technique result process will be described according to a flow chart shown in FIG. 11. First, actual-damage values of the technique W1 designated by the player P1 and the technique W2 designated by the opponent P4 are calculated by the maximum-damage values 35 of the technique W1 and technique W2. The actual-damage value is a damage value to be given finally to an opponent in consideration of parameters except the maximum-damage value 35. To calculate the actual-damage value, it is necessary to calculate a basic-damage value and a modification-damage value, which are described later. As the calculation method for the technique W1 of the player P1 is the same as the calculation method for the technique W2 of the opponent P4, only the case of the technique W1 of the player P1 will be described.

First, the basic-damage value of the technique W1 designated when the player P1 allows the wrestler R1 to battle is calculated (step S241). This basic-damage value is calculated by using the maximum-damage value 35 and the experience value 45 of the technique W1. The maximum-damage value of the technique W1 is obtained from the technique information 30 if the battle data of the player P1. The experience value 45 for the technique W1 of the wrestler R1 is obtained from the player information 40 by using the wrestler ID 21 of the wrestler R1 and the technique ID 31 of the technique W1 as keys, in reference to the battle data of the player P1. For example, in the case where the maximum-damage value of the technique W1 is 100 and the experience value 45 is 99, the basic-damage value is calculated as 100×99%=99.

Next, the modification-damage value is calculated (step S242). This modification-damage value can modify the basic-damage value by taking into account the situation at the moment of using the technique W1. The modification-damage value of the present embodiment is calculated by using a situation ratio and the experience value 45. As the situation ratio, a ratio in accordance with the situation at the moment of using the technique W1 is selected. For example, the ratio for the middle of rush is 150%, the ratio in the case where the wrestler of the opponent P4 is in the passive state is 70%, the ratio in the case where the wrestler of the opponent P4 is in the passive state in the middle of rush is 105%, and the ratio of the other situations is 100%. "Rush" means a state that the parameter "spirit" indicating a movement of the wrestler's fighting spirit reaches the maximum value in the game. The movement of "spirit" may be determined based on the wrestler information and the other parameters.

The modification-damage ratio of the present embodiment can be obtained by the following formula: ((the situation ratio/2)×the experience value/300+(the situation ratio/2)). When the situation ratio is 100%, the modification-damage value of the present embodiment is 66.5%. Next, the actual-damage value is calculated (step S243). The actual-damage value is calculated based on the calculated modification-damage value and the calculated basic-damage value. In the present embodiment, the actual-damage value is obtained by the following formula: (the basic-damage value×the modification-damage value/100×20)/the toughness of the opponent. The value of toughness 25 of the opponent can be obtained from the wrestler information 20 by using the wrestler ID of the wrestler of the opponent P4 as a key. In the present embodiment, the value of toughness 25 of the opponent P4 is 33. In this case, the actual-damage value is equal to 99×66.5/100×20/33=39.9.

As mentioned above, the final damage to be given to the opponent because of the designated technique W is determined as the result of judging comprehensively by taking into account the situation at the moment when the technique W is designated and the parameters such as the toughness 25 of the opponent P4. After the actual-damage values are calculated for the technique W1 and the technique W2 respectively, it is determined which of the techniques wins (step S244). In the present embodiment, it is determined that the technique W wins when the calculated actual-damage of the technique W is bigger than the other calculated actual-damage. Accordingly, in the case where the actual-damage value of technique W1 is 39.9 and the actual-damage value of technique W2 is 30, it is determined that the technique W1 of player P1 wins.

Next, the life-point 26 of the opponent's wrestler who is hit the technique is updated (step S245). Concretely, the value obtained by subtracting the actual-damage value calculated for the technique W1 from the life-point 26 of the opponent P4 is set as the life-point 26 updated. Next, it is determined whether the player P1 who has hit the technique has designated a fall (step S246). It is determined that the player P1 who has hit the technique has designated the fall in the case where the player P1 has pushed the fall button of the operation unit G10 of the game machine G during the technique designation timing. A "fall" means a behavior for aiming to get 3 counts.

When the fall is designated, a fall process is executed, where it is determined whether the fall is established or not (step S247). The establishment of fall is determined as the following: First, a random value is calculated, and in the case where "the updated life-point 26 of the wrestler to whom is hit the technique and tried the fall"−"the random value"<0, which means success of the fall and the other cases means failure of the fall. For example, a parameter for a fall is prepared and the parameter is set to be 1 in the case of success of the fall and the parameter is set to be 0 in the case of failure of the fall. Thereby, depending on the parameter for a fall set to be 0 or 1, it can be determined whether the fall is successful or not. On the other hand, in the case where the player has not designated a fall, the step S247 is skipped to end the technique result process.

Figure 12:
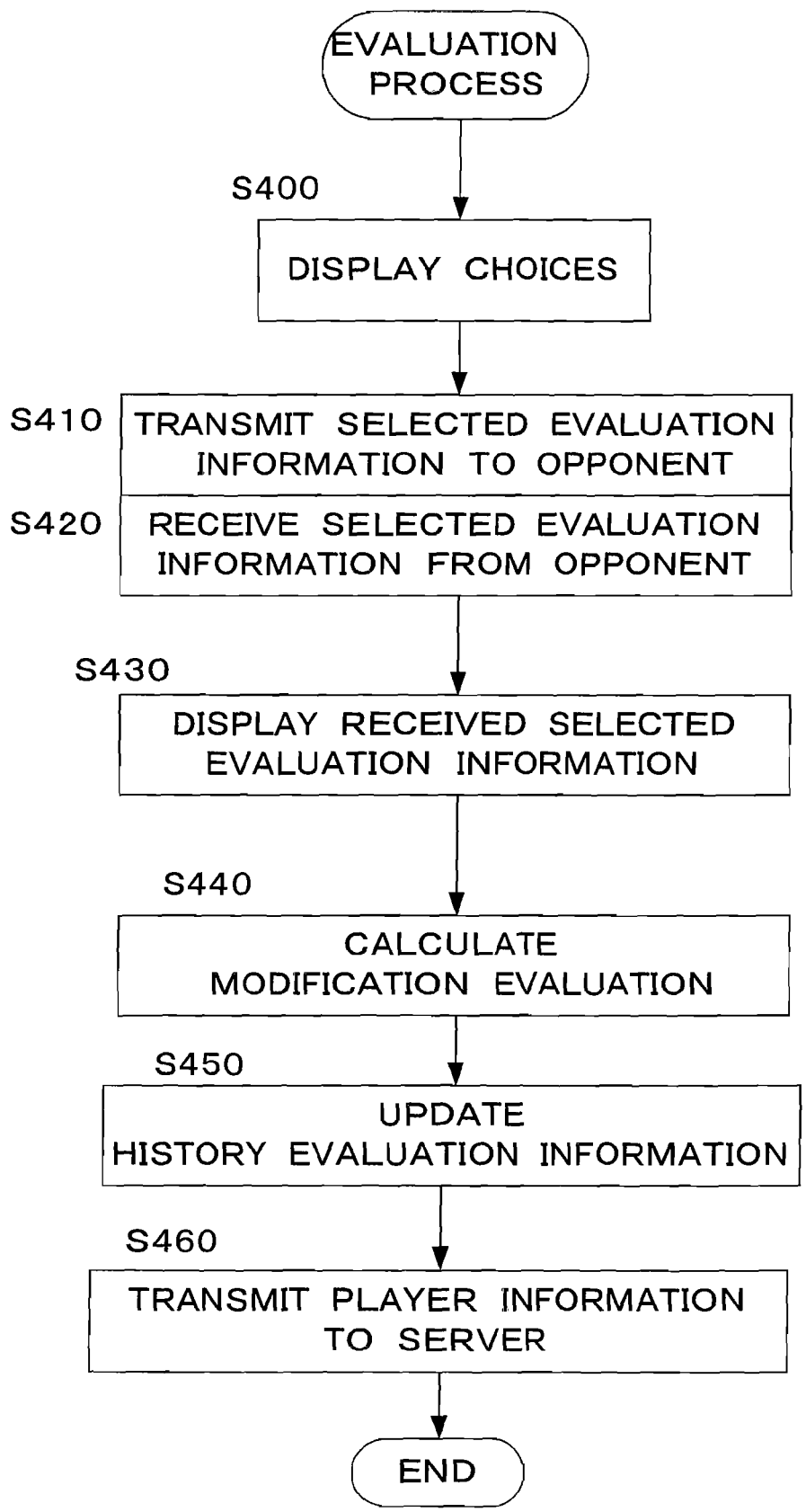
FIG. 12 is a flowchart showing a process flow of an evaluation process.

The evaluation process which is executed after the battle game process will be described according to a flow chart of FIG. 12. The evaluation process is executed by the control unit G70 of each game machine G. As the evaluation processes executed at the game machine G1 and G4 of the opponent players P1 and P4 respectively are similar to each other, the evaluation process executed only at the game machine G1 will be executed. First, a plurality of choices representing evaluations to the player P4 are displayed on the monitor G50 (step S400). Thereby, the control unit G70 functions as an evaluation obtaining device. In the present embodiment, as shown in FIG. 13, five choices from rank A to rank E are prepared, and five-level evaluation sentences corresponded to the choices respectively are displayed. Each of the evaluation sentences is corresponded to a value. In the present embodiment, "EXCELLENT" is corresponded to "+2", "GOOD" is corresponded to "+1", "NORMAL" is corresponded to "+0", "NO GOOD" is corresponded to "−1", and "WORST" is corresponded to "−2".

When one evaluation sentence is selected by the player P1, the value corresponded to the evaluation sentence is set as evaluation data, and the communication unit G30 is allowed to transmit selected evaluation information including the evaluation data and the evaluation sentence to the game machine G4 of the opponent P4 (step S410). On the other hand, the selected evaluation information selected by the opponent P4 as the evaluation to the player P1 is also transmitted from the opponent P4. When the selected evaluation information from the opponent P4 is received (step S420), the received evaluation sentence is displayed on the monitor G50 as the evaluation by the opponent P4 (step S430). Alternatively, as the evaluation by the opponent P4 is not always positive and the received evaluation affects the matching processes executed later, the process in step S430 for displaying the evaluation on the monitor G50 can be omitted for the player P1 not to recognize the evaluation. Additionally, the modification process is executed to calculate the modification evaluation (step S440). Thereby, the control unit G70 functions as a modification evaluation generating device.

The modification evaluation of the present embodiment is a modification value obtained by multiplying "the received evaluation data" by "a coefficient based on the history evaluation information 42 of the opponent P4", and is the information based on the evaluation data being obtained from the modification value and the evaluation data. A value range the history evaluation information 42 capable of covering and a value range the coefficient capable of covering are made to correspond to each other linearly, and thereby the coefficient based on the history evaluation information 42 can be obtained. Namely, the coefficient can be obtained from the line, X axis of which indicates the value of the history evaluation value 42 and Y axis of which indicates the value of the coefficient. For example, in the case where the value range of history evaluation information 42 covers from −500 to +500 and the value range of coefficient covers from 0 to 2, by the line connecting between the two points, that is, (−500, 0) and (+500, 2), the coefficient to be corresponded to the value of the history evaluation information can be obtained. In the case where the history evaluation information 42 of the opponent P4 is a high evaluation, that is, in the case where the evaluation data of rank A has been obtained from the past opponents many times, the history evaluation value is close to +500. In the case where the history evaluation information 42 is a low evaluation, that is, the evaluation data of rank E has been obtained from the past opponents many times, the history evaluation information 42 is close to −500.

After the coefficient is obtained as mentioned above, and when the modification evaluation is calculated, the history evaluation information 42 stored in the storage unit G40 is updated to the value obtained by adding the modification evaluation to the history evaluation information 42 of the player P1 (step S450). Thereby, the control unit G70 functions as a history evaluation updating device. When the history evaluation information 42 is "0" the coefficient is "1". When the evaluation information 42 is a minus value the coefficient is smaller than 1. Accordingly, the modification evaluation becomes smaller than the evaluation data. On the other hand, when the history evaluation information 42 is a plus value the coefficient value is more than "1". Accordingly, the modification evaluation becomes more than the evaluation data.

Thereby, the effect that the evaluation data by a player P having a low history evaluation has on the update of the history evaluation information 42 can be made small, and the effect that the evaluation data by a player having a high history evaluation has on the update of the history evaluation information 42 can be made big. Thereby, the fairness of evaluation data can be expected. In the present embodiment, when the history evaluation information 42 after updated is smaller than −500, the history evaluation information 42 is set to be −500, and when the history evaluation information 42 after updated is over +500, the history evaluation information 42 is set to be +500, so that the range of history evaluation information 42 always covers from −500 to +500. Furthermore, the other parameters of the player information 40, such as the partaking times 43, are updated appropriately. After the player information 40 is updated, the player information 40 of the player P1 stored in the storage unit G40 is transmitted to the server machine S (step S460), and the evaluation process ends.

The server machine S which has received the player information 40 stores the player information 40 into the game data storage device D. Thereby, the player information 40 stored in the game data storage device D is updated. Like this, the history evaluation information 42 is accumulation of the evaluations from the opponents to the player. The game executed in the present embodiment is emphasized on entertainment. Therefore, a player can be identified, such that a player having high history evaluation information is suitable as a game player emphasizing on entertainment, and a player having low history evaluation information is not suitable as a game player emphasizing on entertainment. Then, as the matching process is executed by using the history evaluation information, more suitable opponents can be combined with each other for the professional game emphasized on entertainment.

The present invention is not limited to the above mentioned embodiment but can be executed by various embodiments. For example, in the above mentioned embodiment, the evaluation only as a player emphasizing on entertainment is explained, but more evaluations about other preference are also executed and multifactor evaluation can be executed. The communication network N can be a dedicated line such as LAN. It does not matter which the communication line is wired or wireless. A matching server machine dedicated to executing the matching process can be provided independently of the server machine executing the transmission and reception of the game data storage device D.

In the present embodiment, each game machine is connected directly to the communication network. However, each game machine can be connected to the communication network via a store server which is connected to each few of the game machines. In this case, by giving an IP address to each store server and giving a machine address to each store server, each game machine can be identified by the IP address and the machine address in the communication network N.

The players combined with each other are not limited to two, and may be more than two. In the evaluation process, the evaluation sentence and the value corresponded to each of the choices can be changed appropriately. The number of choices is not limited to five, and is enough to be plural number. With respect to data transmission and reception with another game machine in the battle game process and the evaluation process, it does not matter which game machine's process is earlier.

The invention claimed is:
1. A game system comprising:
a server transmitting and receiving data;
a plurality of game machines;
a player information storage device storing information about players corresponded to each player identification information for identifying each player operating each of the plurality of game machines;
the server determining a combination of the game machines partaking in one game based on the information of players; and
the game being executed between the combined game machines,
wherein the game machine comprises:
a game control device controlling the game executed together with another game machine operated by another player, who is determined by the server to be combined with the player operating the game machine itself;

an evaluation obtaining device obtaining evaluation data that is an evaluation of the another player by asking the player operating the game machine itself to select one of a plurality of evaluations directed to the another player, wherein a positive evaluation corresponds to a positive numerical value and a negative evaluation corresponds to a negative numerical value; and a history evaluation updating device adapted and configured to, when obtaining the evaluation data for the player operating the game machine itself from the game machine operated by the another player, update history evaluation information based on the evaluation data obtained, wherein the history evaluation information is included in the player information of the player operating the game machine itself and is updated by adding the positive numerical value or the negative numerical value corresponding to the evaluation data obtained so that the history evaluation information indicates a numerical value reflecting an overall history of the obtained evaluation data directed to the player; and wherein the server comprises:

a combination determining device determining based on the history evaluation information, a combination of game machines to partake in the game.

2. The game system according to claim 1, wherein the game machine comprises a history evaluation communication device transmitting the history evaluation information included in the player information of the player operating the game machine itself with the player identification information of the player operating the game machine itself, and the combination determining device determines the combination based on the history evaluation information transmitted from the history evaluation communication device during a predetermined time.

3. The game system according to claim 1, wherein the game is a game where a skill evaluation with respect to skills of the player operating the game machine itself is executed in accordance with a predetermined criteria, and a game result based on the skill evaluation is presented to the player operating the game machine itself.

4. The game system according to claim 1, wherein the game machine comprises a modification evaluation generating device, when obtaining the evaluation data from the another game machine operated by the another player, generating a modification evaluation based on the history evaluation information of the another player, and the history evaluation updating device updates the history evaluation information of the player operating the game machine itself by information based on the evaluation data obtained by using the evaluation data and the modification evaluation.

5. The game system according to claim 4, wherein the game machine comprises an evaluation data transmitting device transmitting the evaluation data with the player identification information of the player operating the game machine itself to the another game machine operated by the another player, the modification evaluation generating device, when receiving the evaluation data transmitted from the evaluation data transmitting device of the another game machine operated by the another player, generates the modification evaluation based on the history evaluation information corresponding to the player identification information of the another player transmitted with the evaluation data, and the history evaluation updating device updates the history evaluation information of the player operating the game machine itself by the modification evaluation and information based on the evaluation data obtained by using the evaluation data transmitted from the evaluation data transmitting device of the another game machine operated by the another player.

6. The game system according to claim 4, wherein the history evaluation information includes an evaluation value obtained by modifying by a modification value included in the modification evaluation, the evaluation data transmitted from the evaluation data transmitting device of the another game machine operated by the another player, and the modification evaluation is in accordance with measure of the evaluation value of player history evaluation information of the another player.

7. The game system according to claim 1, wherein the evaluation obtaining device presents to the player operating the game machine itself, a plurality of choices where, with respect to a particular tendency about the game, evaluation sentences indicating in a stepwise fashion about whether the combined player the tendency is strong or not, and obtains as the evaluation data, a value corresponded to the choice selected by the player.

8. The game system of claim 7, wherein the values corresponding to the plurality of evaluations are discrete.

9. The game system according to claim 1, wherein the history evaluation information includes a plurality of pieces of evaluation information; and wherein the combination determining device determines a combination of game machines to partake in the game by comparing the plurality of pieces of evaluation information for respective players with each other.

10. The game system of claim 1, wherein the evaluation of the another player is an evaluation of skill of the another player.

* * * * *